(12) United States Patent
Oogane

(10) Patent No.: US 9,586,445 B2
(45) Date of Patent: Mar. 7, 2017

(54) HEAVY DUTY TIRE

(75) Inventor: Shun Oogane, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 513 days.

(21) Appl. No.: 13/698,878

(22) PCT Filed: May 20, 2011

(86) PCT No.: PCT/JP2011/061649
§ 371 (c)(1),
(2), (4) Date: Feb. 4, 2013

(87) PCT Pub. No.: WO2011/145721
PCT Pub. Date: Nov. 24, 2011

(65) Prior Publication Data
US 2013/0118664 A1    May 16, 2013

(30) Foreign Application Priority Data

May 20, 2010 (JP) .................................. 2010-116022

(51) Int. Cl.
*B60C 11/01* (2006.01)
*B60C 11/04* (2006.01)
(Continued)

(52) U.S. Cl.
CPC ................ *B60C 11/04* (2013.01); *B60C 3/04* (2013.01); *B60C 11/01* (2013.01); *B60C 11/11* (2013.01);
(Continued)

(58) Field of Classification Search
CPC .......... B60C 2200/06; B60C 2200/065; B60C 2011/013; B60C 11/01; B60C 11/311; B60C 11/1384; B60C 11/1392
See application file for complete search history.

(56) References Cited

U.S. PATENT DOCUMENTS 4,784,200 A * 11/1988 Fujiwara ................... 152/209.18
5,137,068 A *  8/1992 Loidl et al. .............. 152/209.27
(Continued)

FOREIGN PATENT DOCUMENTS

EP      0602989      *  6/1994
JP      61235206 A      10/1986
(Continued)

OTHER PUBLICATIONS

English machine translation of JP2006-024211, dated Jan. 1994.*
(Continued)

*Primary Examiner* — Michael H Wilson
*Assistant Examiner* — Robert Dye
(74) *Attorney, Agent, or Firm* — Sughrue Mion, PLLC

(57) ABSTRACT

In a pneumatic tire 1, a side surface (101), on a buttress portion (14) side, of a land portion block (100) is inclined to the inside of the land portion block (100). The length (Lb1), in a tread width direction, of an and portion (100B) of the land portion block (100) is smaller than the length (La1), in the tread width direction, of an end portion (100A). The end portion (100B) is located at a rear side in a rotational direction (R) in which the pneumatic tire (1) installed on a vehicle rotates when the vehicle moves forward, and the end portion (100A) is located at a front side in the rotational direction (R).

10 Claims, 14 Drawing Sheets

(51) Int. Cl.
*B60C 3/04* (2006.01)
*B60C 11/11* (2006.01)
*B60C 11/12* (2006.01)
*B60C 11/13* (2006.01)

(52) U.S. Cl.
CPC .......... *B60C 11/12* (2013.01); *B60C 11/1384* (2013.04); *B60C 2011/1254* (2013.04); *B60C 2200/06* (2013.04); *B60C 2200/065* (2013.04)

(56) References Cited

U.S. PATENT DOCUMENTS

| | | | | |
|---|---|---|---|---|
| 6,065,517 | A | * | 5/2000 | Maruyama .......... B60C 11/0302 152/209.24 |
| 6,138,728 | A | * | 10/2000 | Miyazaki ................. 152/209.15 |
| 2007/0012389 | A1 | * | 1/2007 | Ito ............................ 152/209.22 |
| 2008/0289738 | A1 | | 11/2008 | Nakamura et al. |
| 2010/0200134 | A1 | * | 8/2010 | Murata ...................... 152/209.9 |
| 2011/0277895 | A1 | * | 11/2011 | Takahashi ............... 152/209.18 |

FOREIGN PATENT DOCUMENTS

| | | | | |
|---|---|---|---|---|
| JP | 1178007 | A | | 7/1989 |
| JP | 02-241805 | | * | 9/1990 |
| JP | 2006-024211 | | * | 1/1994 |
| JP | 06-048122 | | * | 2/1994 |
| JP | 10175406 | A | | 6/1998 |
| JP | 2002-205514 | | * | 7/2002 |
| JP | 2003-205706 | A | | 7/2003 |
| JP | 2009-040156 | | * | 2/2009 |
| JP | 2010-023610 | | * | 2/2010 |
| WO | 2006/013758 | A1 | | 2/2006 |
| WO | 2008/152914 | A1 | | 12/2008 |

OTHER PUBLICATIONS

English machine translation of JP2002-205514, dated Jul. 2002.*
English machine translation of JP06-048122, dated Feb. 1994.*
English machine translation of JP2010-023610, dated Feb. 2010.*
English machine translation of JP01-178007, dated Jul. 1989.*
International Search Report for PCT/JP2011/061649 dated Aug. 16, 2011.
Extended European Search Report, dated Jul. 15, 2014, issued in counterpart European Patent Application No. 11783653.6.
Communication dated Apr. 22, 2015 from the Japanese Patent Office in counterpart application No. 2012-515942.

* cited by examiner (a)

(b)

(a)

(b)

(a)

(b)

HEAVY DUTY TIRE

CROSS REFERENCE TO RELATED APPLICATIONS

This application is a National Stage of International Application No. PCT/JP2011/061649 filed May 20, 2011, claiming priority based on Japanese Patent Application No. 2010-116022 filed May 20, 2010, the contents of all of which are incorporated herein by reference in their entirety.

TECHNICAL FIELD

The present invention relates to a heavy duty tire having bead portions, sidewall portions continuous to the respective bead portions, a tread portion to come into contact with a road surface, and buttress portions extending inward in a tire radial direction from respective tread end portions located on outer sides in a width direction of the tread portion and continuous to the respective side wall portions.

BACKGROUND ART

Because of the hysteresis behavior of a viscoslastic rubber material, a tread portion of a tire repeats deformation and contraction during the rotational motion of the tire and thereby heats up. When the rubber material constituting the tread portion increases in amount, the hysteresis loss due to bending deformation and shear deformation caused by the rotational motion of the tire increases, as well. For this reason, a tire having a thick tread portion is likely to have a high temperature.

Especially, a heavy duty tire for a large vehicle used at a mine or a construction site is characterized by its tendency to heat up owing not only to the large amount of rubber material used, but also to the repeated deformation and contraction of the tire used in a heavy load state, on a poor road surface, and under harsh traction conditions. When a tire has a high temperature when rotating, troubles such as separation between the rubber material which forms the tread portion and a belt layer may occur. This contributes to shortening of the tire replacement cycle.

In this respect, the following method is conventionally known, specifically, secondary grooves extending in a tread width direction are formed in the tread portion in order to reduce the amount of rubber material, which is a factor of the heat generation, and also to increase the surface area of the tread portion so that heat dissipation is promoted in the tread portion (for example, Patent Document 1).

However, such a conventional tire has the following problem. Specifically, although heat dissipation can be promoted by forming lateral groove portions (secondary grooves) intersecting with the tire circumferential direction so as to increase the groove area, the increase in the groove area leads to decrease in the rigidity and wear resistance of the tread portion. In this way, the dissipation performance of a tire and the rigidity of a tire have a trade-off relation. Accordingly, there is a limit on obtaining a high dissipation performance by increasing the groove area.

PRIOR ART DOCUMENT

Patent Document

Patent Document 1: Japanese Patent Application Publication No. 2003-205705, FIG. 1 and the like

SUMMARY OP THE INVENTION

A first feature is summarized as a heavy duty tire, comprising: bead portions (bead portions 11); a sidewall portions (sidewall portions 12) continuous to the respective bead portions; a tread portion (tread portion 13) to be in contact with a road surface; and buttress portions (buttress portions 14) each extending inward in a tire radial direction from a corresponding tread end portion (tread end portion 13e) of the tread portion and continuous to a corresponding one of the sidewall portions, the tread end portion being located on an outer side, in a width direction, of the tread portion, wherein in the tread portion, a plurality of lateral groove portions (lateral groove 40A) intersecting with a tire circumferential direction and land portions (circumferential land portion 30A) defined by the lateral groove portions are formed, at least one of end portions of each lateral groove portion opening to a tread end, the land portions each having a side surface intersecting with the width direction of the tread portion, a length, in the tread width direction, of each of the land portions decreases from one side to the other side in the tire circumferential direction, the length, in the tread width direction, of the land portion is a length from a groove end reference line extending in the tire circumferential direction to the tread end, and the groove end reference line is defined by inner ends, in the tread width direction, of the respective lateral groove portions adjacent to each other in the tire circumferential direction with the land portion interposed therebetween.

In a heavy duty tire according to the first aspect, rotation of the tire causes air to pass along the tire surface and to be led into the lateral groove portions, or to be led from the lateral portions to the outer side in the tire width direction. Accordingly, airflow is generated from the side surface of the land portions to the lateral groove portions. Thereby, air around the tire is drawn into the lateral groove portions, and thus the amount of air flowing inside the lateral groove portions can be increased. As a result, the heat transfer coefficient inside the lateral groove portions can be improved, so that the temperature of the land portions can be decreased. Further, the temperature of the tread portion can be decreased.

In the first feature, a length, in the tread width direction, of one of end portions, in the tire circumference direction, of the buttress portion including the land portion is smaller than a length, in the tread width direction, of the other one of the end portions, in the tire circumference direction, of the buttress portion including the land portion.

In the first feature, the lateral groove portions are inclined with respect to a tread width direction line extending in the tread width direction.

In the first feature, a circumferential groove portion extending in the tire circumferential direction is formed, and the lateral groove portions communicate with the circumferential groove portion.

In the first feature, a circumferential groove portion extending in the tire circumferential direction is formed, and a groove depth of the circumferential groove portion is larger than a groove width of the circumferential groove portion.

In the first feature, a circumferential groove portion extending in the tire circumferential direction is formed, and a groove width of each of the lateral groove portions is larger than a groove width of the circumferential groove portion.

In the first feature, in a plan view of the tread portion, the side surface of the land portion intersecting with the width direction of the tread portion is a curved line.

In the first feature, in a plan view of the tread portion, the side surface of the land portion intersecting with the width direction of the tread portion is a curved line having an inflection point.

In the first feature, an area of the land portion at its surface in the tread portion to be in contact with the road surface is smaller than an area of the land portion at portions continuous to groove bottom portions of the lateral groove portions.

In the first feature, the lateral groove portions are inclined with respect to a tread width direction line extending in the tread width direction, a length, in the tread width direction, of one of end portions, in the tire circumferential direction, of the land portion is larger than a length, in the tread width direction, of an end portion of the land portion having an obtuse angle between the side surface of the land portion and a wall surface of a corresponding one of the lateral groove portions.

The heavy duty tire according to the first feature is a tire for a construction, vehicle.

MODES FOR CARRYING OUT THE INVENTION

An embodiment of a pneumatic tire 1 according to the present invention is described with reference to the drawings. Specifically, descriptions are given of (1) the inside configuration of the pneumatic tire, (2) description of the land portions, (3) Operation and effect, (4) modifications, and (5) other embodiments.

Note that, in the following description of the drawings, same or similar reference signs denote same or similar elements and portions. In addition, it should be noted that the drawings are schematic and ratios of dimensions and the like are different from actual ones. Therefore, specific dimensions and the like should be determined in consideration of the following description. Moreover, the drawings also include portions having different dimensional relationships and ratios from each other.

(1) Configuration of the Pneumatic Tire

Figure 1:
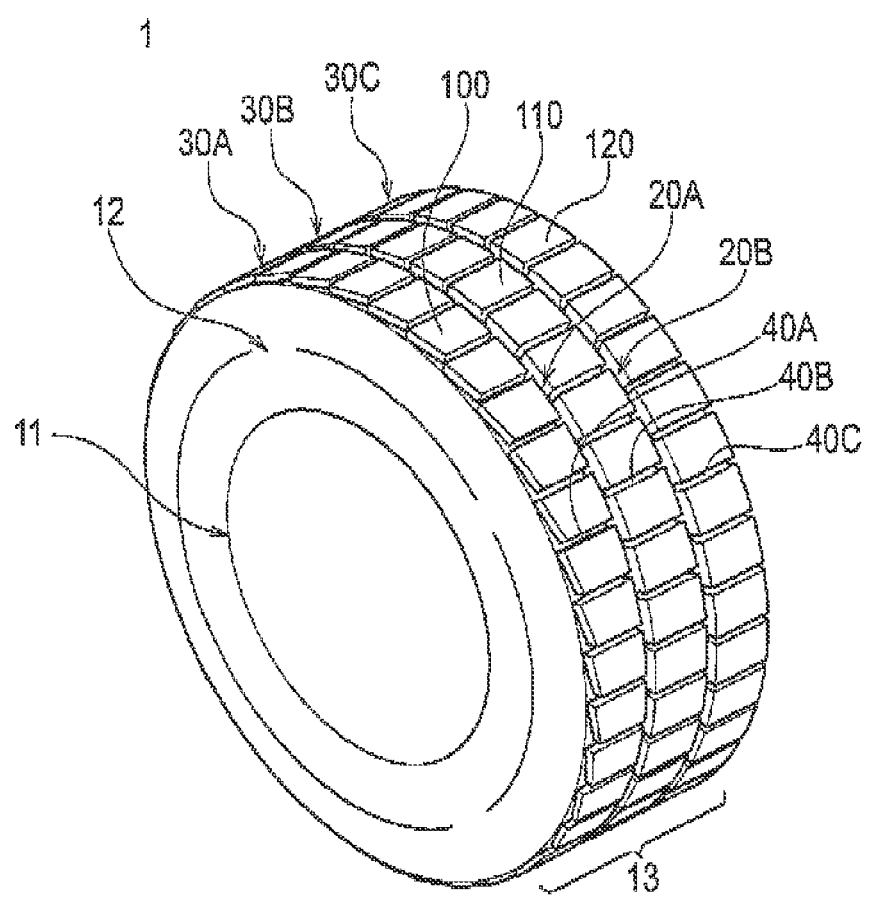
FIG. 1 is a perspective view of a pneumatic tire according to an embodiment.
Figure 2:
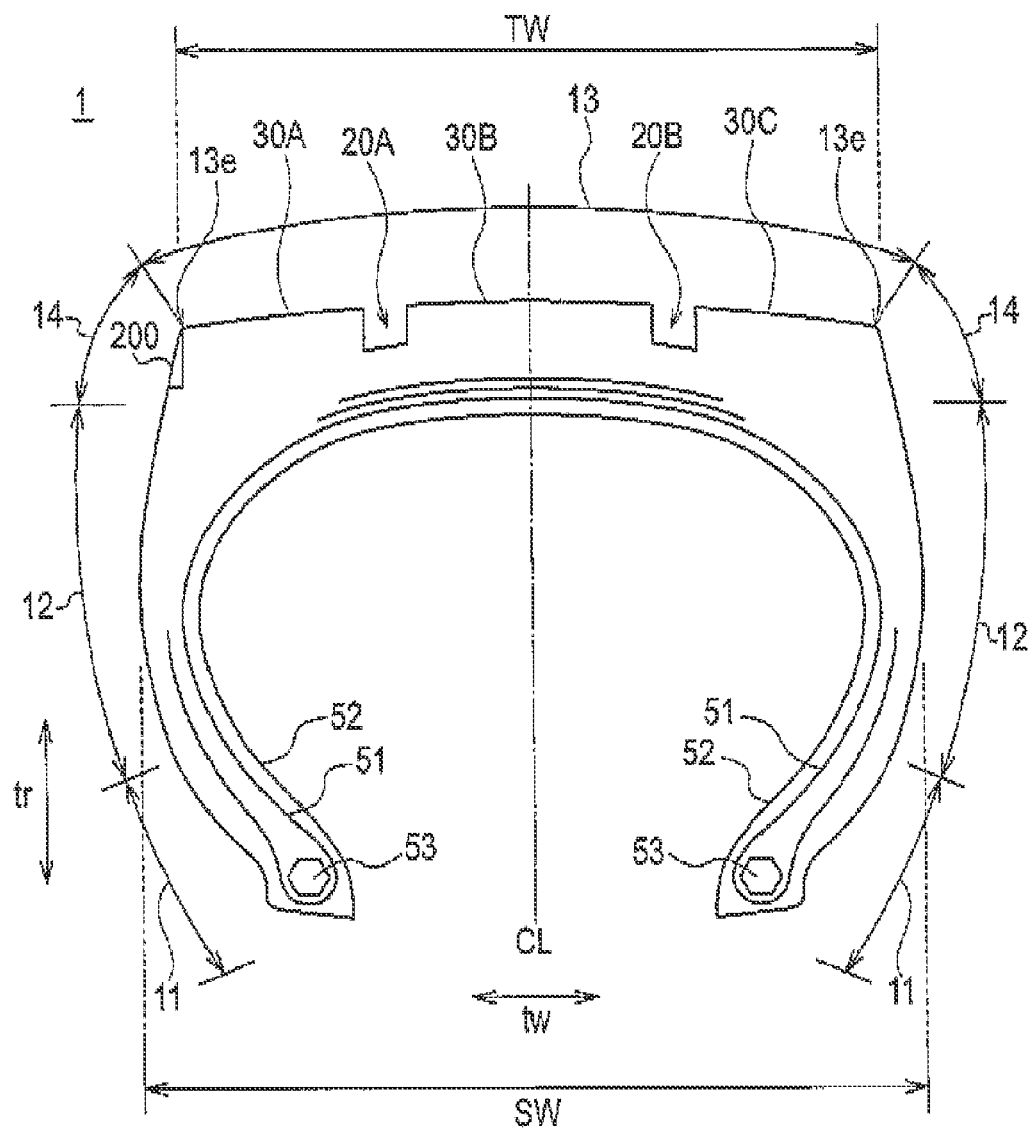
FIG. 2 is a sectional view of the pneumatic tire according to this embodiment, taken in a tread width direction and a tires radial direction.

FIG. 1 is a perspective view of the pneumatic tire 1 according to the present invention. FIG. 2 is a sectional view of the pneumatic tire 1, taken along a tread width direction tw and a tire radial direction tr.

As shown in FIG. 1, the pneumatic tire 1 has bead portions 11 in contact with corresponding rims, sidewall portions 12 each forming a side surface of the tire, a tread portion 13 which is to come into contact with the road surface, and buttress portions 14 each located between the side wall portion 12 and the tread portion 13. Note that the pneumatic tire 1 is a heavy duty tire in the embodiment. For example, the pneumatic tire 1 is a tire for a construction vehicle.

The buttress portions 14 are located on an extension, in the tire radial direction, of the corresponding sidewall portions 12, and are portions forming side surfaces of the tread portion 13. Each buttress portion 14 is a portion extending between a tread end portion 13e to groove bottom portions of lateral grooves (lug grooves) opening to the tread end portion 13e. The buttress portions 14 extend inward in the tire radial direction tr from the corresponding tread end portions 13e located on the outer sides, in the tread width direction, of the tread portion 13. The buttress portions 14 are portions not in contact with the ground in normal running.

Circumferential grooves 20A, 20B extending in a tire circumferential direction tc are formed in the tread portion 13. Circumferential land portions 30A, 30B, 30C defined by the circumferential grooves 20A, 20B are also formed.

Lateral grooves 40A intersecting with the tire circumferential direction are formed in the circumferential land portion 30A. At least one of end portions of each lateral groove 40A opens to a tread end. Lateral grooves 40B intersecting with the tire circumferential direction are formed in the circumferential land portion 30B. Lateral grooves 40C intersecting with the tire circumferential direction are formed in the circumferential land portion 30C. At least one of end portions of each lateral groove 40C opens to another tread end. In this embodiment, land portion blocks 100, 110, 120 are formed by dividing the circumferential land portions 30A, 30B, 30C with the lateral grooves 40A, 40B, 40C, respectively. The lateral grooves 40A, 40B, 40C communicate with the circumferential grooves 20A, 20B.

The pneumatic tire 1 has a carcass layer 51 which forms the framework of the pneumatic tire 1. An inner liner 52 is provided inward, in the tire radial direction, of the carcass layer 51. The inner liner 52 is equivalent of an inner tube, and is a rubber layer with a high airtightness. Both ends of the carcass layer 51 are supported by paired beads 53.

A belt layer 54 is arranged outward, in the tire radial direction, of the carcass layer 51. The belt layer 54 has a first belt layer 54a and a second belt layer 54b which are rubberized steel cords. The steel cords forming the first belt layer 54a and the second belt layer 54b are each arranged at a predetermined angle with respect to a tire equator CL. The tread portion 13 is arranged outward, in the tire radial direction, of the belt layer 54 (the first belt layer 54a and the second belt layer 54b).

In the pneumatic tire 1, a side surface 101, on the buttress portion 14 side, of each land portion block 100 obtained by dividing the circumferential land portion 30A with the lateral grooves 40A is inclined to the inside of the land portion block 100 with respect to a plane parallel to the tire circumferential direction and the tire radial direction.

SW denotes the maximum width of the pneumatic tire 1, and TW denotes the width of the tread portion 13 of the pneumatic tire 1. Instead of air, an inert gas such as nitrogen gas may be filled in the pneumatic tire 1. In this embodiment, the pneumatic tire 1 is, for example, a radial tire having an aspect ratio of 80% or lower, a rim diameter of 57", a weight bearing capability of 60 mton or more, and a load coefficient (k-factor) of 1.7 or larger.

(2) Description of the Land Portions

Figure 3:
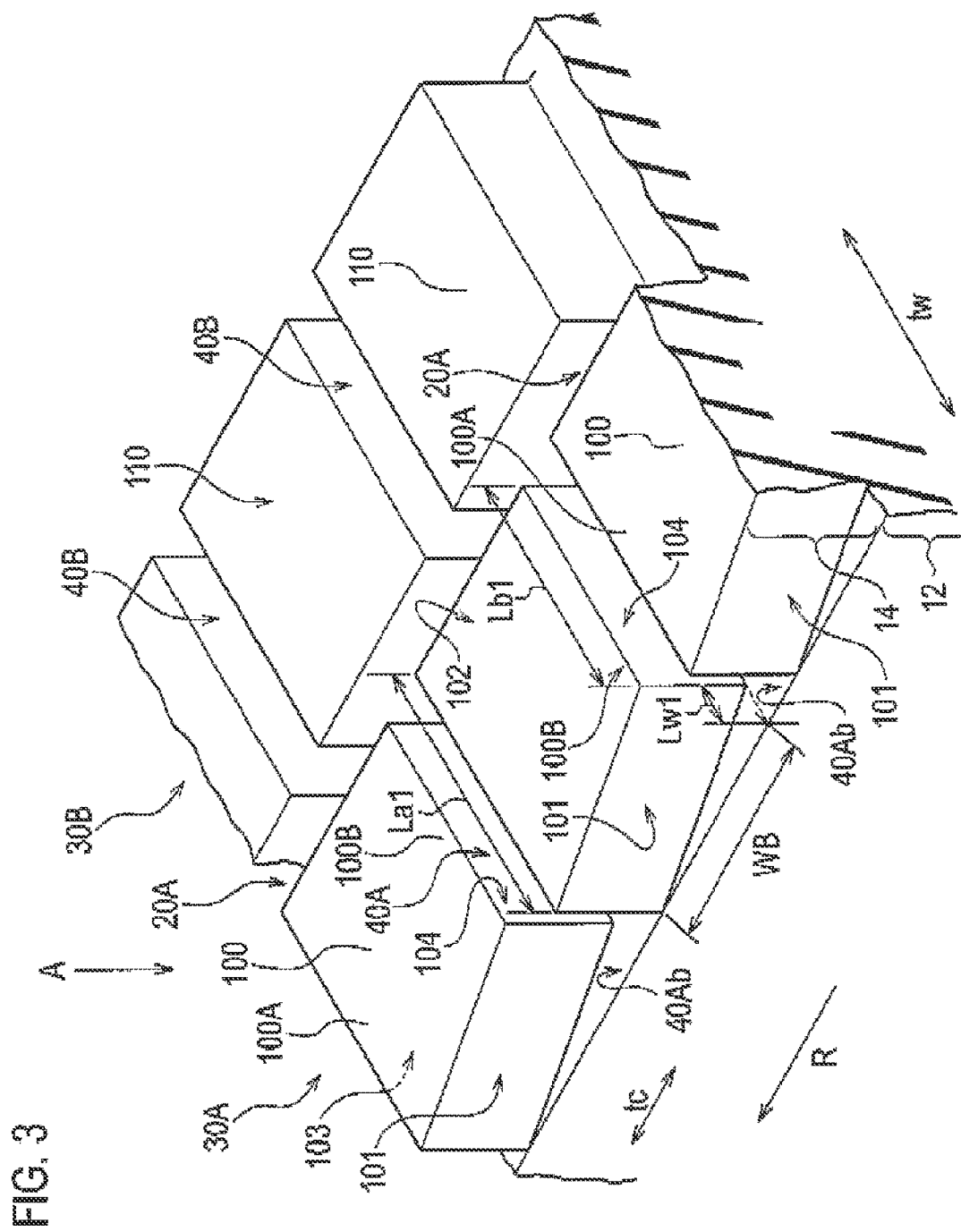
FIG. 3 is an enlarged perspective view of a tread of the pneumatic tire.
Figure 4:
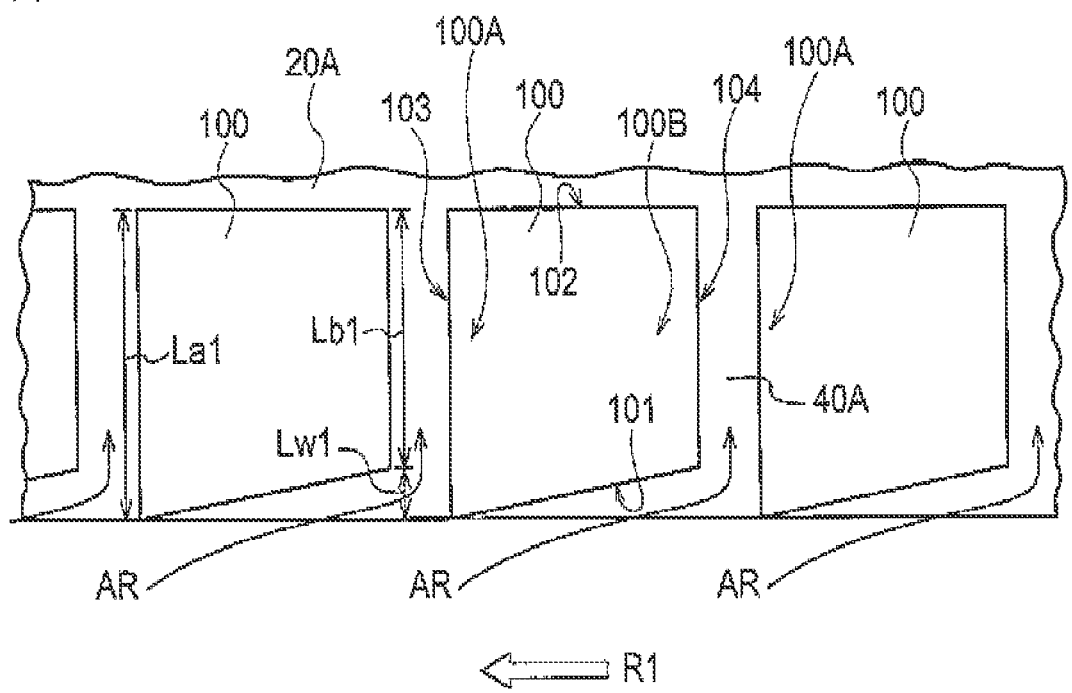
FIG. 4 is a plan view seen in a direction of arrow A in FIG. 3.
Figure 4:
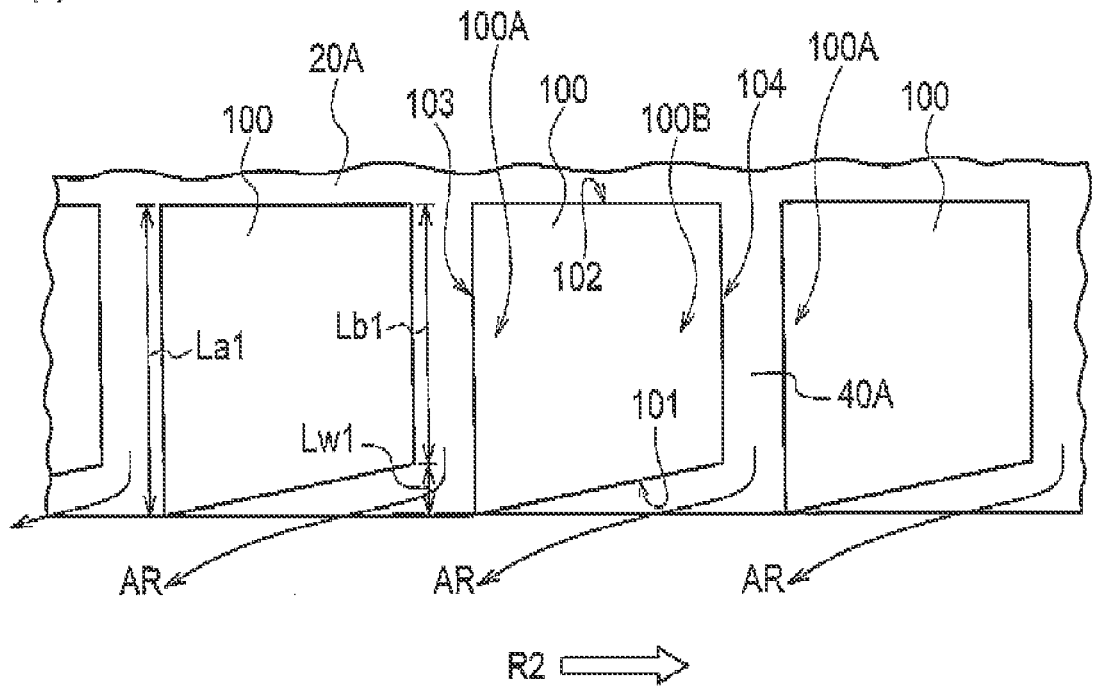

FIG. 3 is an enlarged perspective view of the tread portion 13 of the pneumatic tire. FIG. 4 is a plan view seen in a direction of arrow A in FIG. 3. Each land portion block 100 obtained by dividing the circumferential land portion 30A with the lateral grooves 40A has the side surface 101 located on the buttress portion 14 side, a side surface 102 located on the opposite side from the side surface 101, a side surface 103 on an end portion 100A side of the land portion block 100, and a side surface 104 on an and portion 100B side of the land portion block 100. The end portion 100A is located on one side, in the tire circumferential direction, of the land portion block 100, and the end portion 100B is located on the other side, in the tire circumferential direction, of the land portion block 100.

The end portion 100A on one side, in the tire circumferential direction, of the land portion block 100 is located on a rear side in a rotational direction (indicated by arrow R in FIG. 3) of the pneumatic tire 1 installed on a vehicle and rotated when the vehicle moves forward. The end portion 100B on the other side, in the tire circumferential direction, of the land portion block 100 is located on a front side in the rotational direction R. Length Lb1, in the tread width direction, of the end portion 100B of the land portion block 100 is smaller than length La1, in the tread width direction, of the end portion 100A.

Note that length La1 in the tread width direction and length Lb1 in the tread width direction are the length from a groove end reference line, extending in the tire circumferential direction, to the tread end. The groove end reference line is defined by end portions, at an inner side in the tread width direction, of the lateral grooves 40A adjacent to each other in the tire circumferential direction with the land portion block 100 in between. In the first embodiment, the lateral grooves 40A communicate with the circumferential groove 20A which extends circumferentially, and for this reason the groove end reference line can also be regarded as an outer end portion, in the tread width direction, of the circumferential groove 20A.

In FIG. 3, length Lw1 denotes the difference between length Lb1, in the tread width direction, of the end portion 100B of the land portion block 100 and length La1, in the tread width direction, of the end portion 100A of the land portion block 100, and length Lw1 is preferably 5 mm or more.

The side surface 101 extends while being inclined toward the inside of the land portion block 100 with respect to the plans parallel to the tire circumferential direction, and connects to the side surface 104 of the land portion block 100, the side surface 104 forming an inner wall of the lateral groove 40A. The end portion 100B, on a rotational-direction rear side in the tire circumferential direction, of the land portion block 100 is located inward, in the tread width direction, of the sidewall portion 12 by length Lw. In other words, the rotational-direction rear side, in the tire circumferential direction, of the land portion to block 100 of the buttress portion 14 is located inward, in the tread width direction, of the side wall portion 12 by length Lw. For this reason, a step is formed between the buttress portion 14 and each side surface 101. A groove bottom 40Ab which is a groove bottom of the lateral groove 40A extends from the end port ion 100B on the rotational-direction rear end in the tire circumferential direction to the end portion 100A. The groove bottom 40Ah is located between the buttress portion 14 and the side surface 101.

(3) Operation and Effect

In the pneumatic tire 1, the end portion 100B on the rotational-direction rear side, in the tire circumferential direction, of the land portion block 100 is located inward, in the tread width direction, of the sidewall portion 12 by length Lw.

Accordingly, as shown in FIG. 4(a), when the pneumatic tire 1 rotates in a rotational direction R1, airflow (relative wind) AR generated relative to the rotation of the pneumatic tire 1 and flowing in the opposite direction from the rotational direction R1 collides with the side surface 103 of the land portion block 100 located on the rear side in the rotational direction, and is led to the lateral grooves 40A. In this way, airflow AR is formed from the side surface 101 of the land portion block 100 to the lateral groove 40A. Thereby, air around the pneumatic tire 1 is drawn into the lateral grooves 40A, and the amount of air flowing through the lateral grooves 40A can be increased. This can improve the heat-transfer coefficient inside the lateral grooves 40A to decrease the temperature of the land portion blocks 100. Further, the temperature of the tread portion 13 can be decreased.

Moreover, as shown in FIG. 4(b), when the pneumatic tire 1 rotates in a rotational direction R2, the rotation of the pneumatic tire 1 generates airflow (relative wind) AR flowing along the side surface 101. Accordingly, escape of air from the lateral grooves 40A to the outer side in the tire width direction is promoted, so that the amount of air flowing inside the lateral grooves 40A can be increased. In this way, the heat transfer coefficient inside the lateral groove 40A is improved to allow decrease in the temperature of the land portion blocks 100. Further, the temperature of the tread portion 13 can be decreased.

(4) Modifications (4-1) Modification 1

Figure 5:
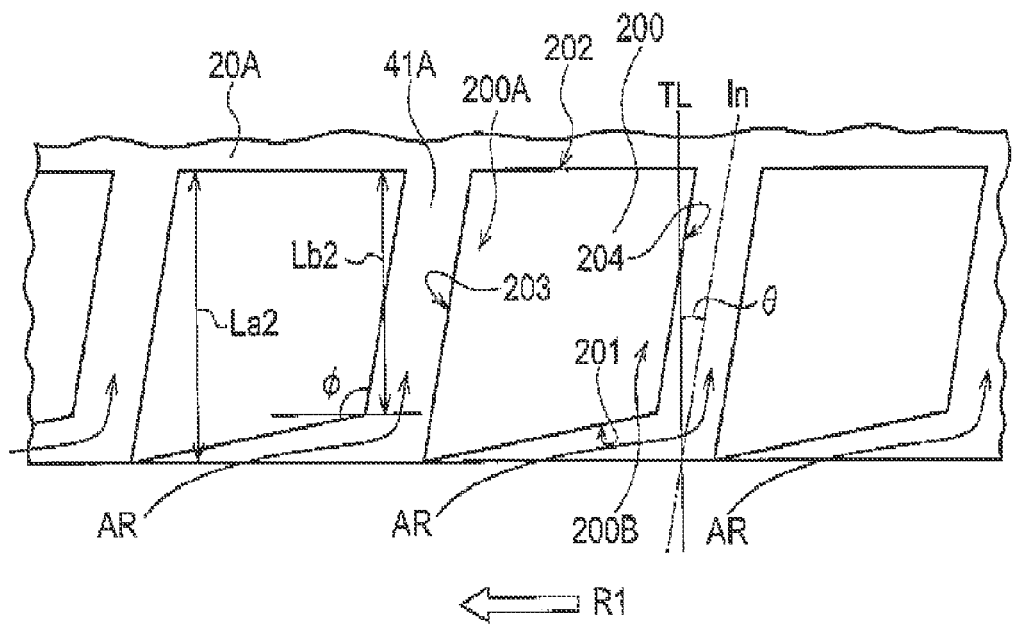
FIG. 5 is a plan view of a pneumatic tire shown as Modification 1 of this embodiment, seen in a direction perpendicular to its tread portion, and is a schematic diagram illustrating airflow AR generated when the pneumatic tire rotates in a rotational direction R.
Figure 5:
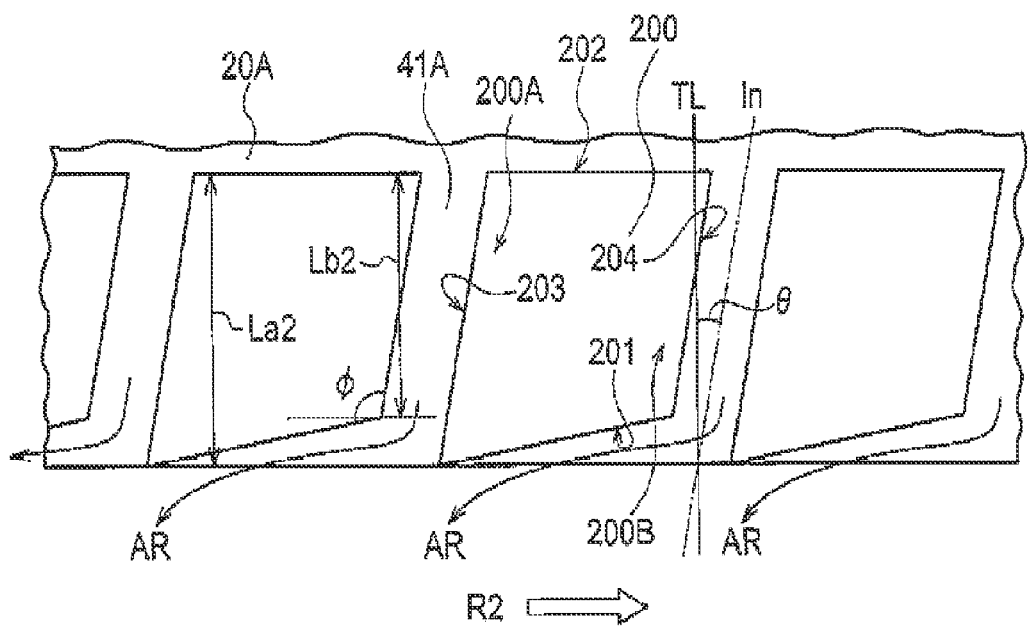

FIG. 5 is a plan view of a pneumatic tire 2 shown as a modification of this embodiment, seen in a direction perpendicular to the tread portion, and is a schematic view illustrating airflow AR generated when the pneumatic tire 2 rotates in the rotational direction R. In the pneumatic tire 2 shown as Modification 1, a center line ln of each lateral groove 41A is inclined by an angle θ with respect to a tread width direction line TL extending in the tread width direction, the center line ln extending in a direction in which the lateral groove 41A formed in the circumferential land portion. 30A, extends.

Land portion blocks 200 defined by the circumferential groove 20A and the lateral grooves 41A each have a side surface 201 located on the buttress portion 14 side, a side surface 202 located on the opposite side from the side surface 201, a side surface 203 on an end port ion 200A side of the land portion block 200, and a side surface 204 on an end portion 200B side of the land portion block 200. The end portion 200A is located on one side, in the tire circumferential direction, of the land portion block 200, and the end portion 200B is located on the other side, in the tire circumferential direction, of the land portion block 200.

The end portion 200A on one side, in the tire circumferential direction, of the land portion block 200 is located on a rear side in a rotational direction (indicated by arrow R in FIG. 5) of the pneumatic tire 2 installed on a vehicle and rotated when the vehicle moves forward. The end portion 200B on the other side, in the tire circumferential direction, of the land portion block 200 is located on a front side in the rotational direction R.

When such inclined lateral grooves 41A are formed, length La2, in the tread width direction, of the end portion 200A of the land portion block 200 on one side in the tire circumferential direction is larger than length Lb2, in the tread width direction, of the end portion 200B having an obtuse angle φ formed between the side surface 201 of the land portion block, 200 and a wall surface of the lateral groove portion 41A.

As FIG. 5(a) shows, when the pneumatic tire 2 rotates in the rotational direction R1, airflow (relative wind) AR generated by the rotation collides with the side surface 203, and is drawn into the lateral groove 41A. Since the lateral groove 41A is inclined, the airflow AR is easily drawn into the lateral groove 41A. Thereby, the heat-transfer coefficient inside the lateral grooves 41A can be improved to enhance the effect of decreasing the temperature of the land portion blocks 200.

Further, as shown in FIG. 5(b), when the pneumatic tire 2 rotates in the rotational direction R2, the rotation of the pneumatic tire 2 generates airflow (relative wind) AR flowing along the side surface 201. As a result, escape of air from the lateral grooves 41A to the outer side in the tire width direction is promoted, so that the amount of air flowing inside the lateral grooves 41A can be increased. In this way, the heat transfer coefficient inside the lateral groove 41A is improved to allow decrease in the temperature of the land portion blocks 200. Further, the temperature of the tread portion 13 can be decreased.

(4-2) Modification 2

Figure 6:
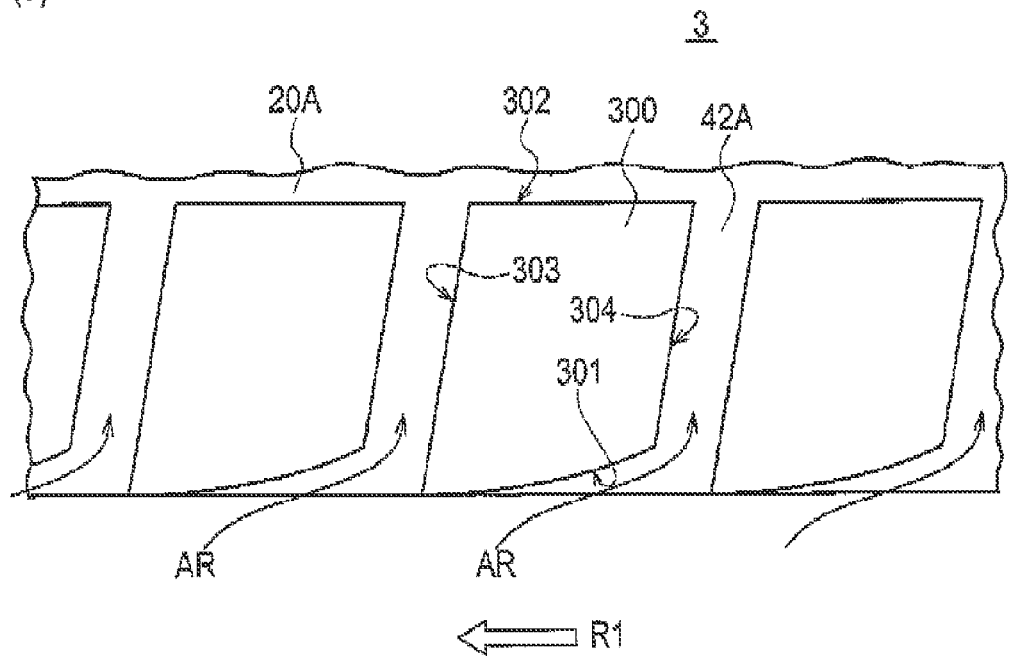
FIG. 6 is a plan view of a pneumatic tire shown as Modification 2 of this embodiment, seen in a direction perpendicular to its tread portion, and is a schematic diagram illustrating airflow AR generated when the pneumatic tire rotates in the rotational direction R.
Figure 6:
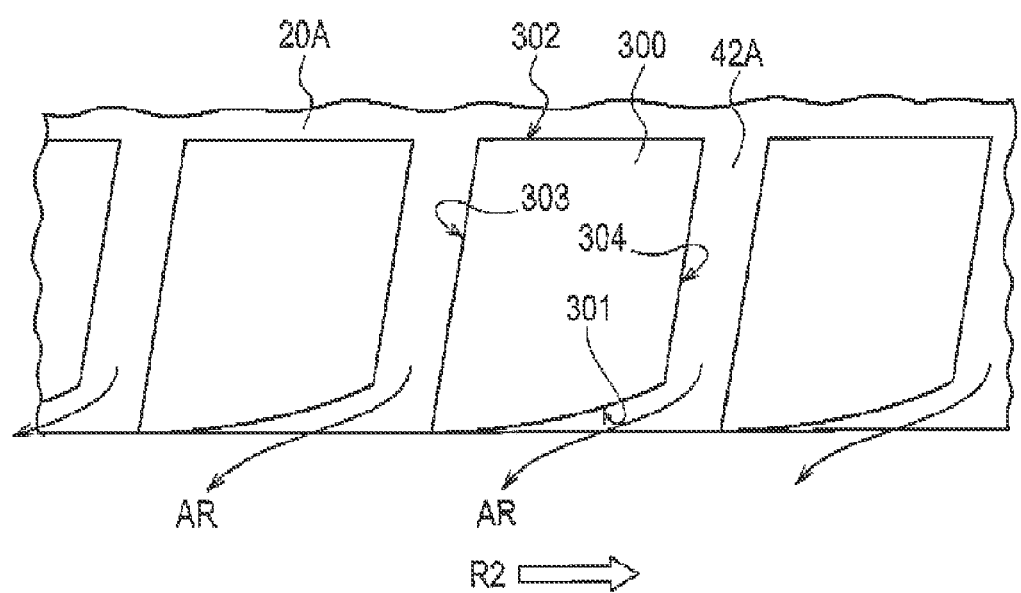

FIGS. 6(a), (b) are plan views of a pneumatic tire 3 shown as a modification of the present invention, seen in a direction perpendicular to the tread portion, and are schematic views illustrating airflow AR generated when the pneumatic tire 3 rotates. In the pneumatic tire 3 shown as Modification 2, land portion blocks 300 defined by the circumferential groove 20A and lateral grooves 42A each have a side surface 301 located on the buttress portion 14 side, a side surface 302 located on the opposite side from the side surface 301, a side surface 303 on an end portion 300A side of the land portion block 300, and a side surface 304 on an end portion 300B side of the land portion, block 300. The end portion 300A is located on one side, in the tire circumferential direction, of the land portion block 300, and the end portion 300B is located on the other side, in the tire circumferential direction, of the land portion block 300. In this embodiment, the side surface 301 of each land portion block 300 is a curved surface bulging to the outer side in the tread width direction.

In the pneumatic tire 3, the side surface 301 of each land portion block 300 is a curved surface bulging to the outer side in the tread width direction. Accordingly, as shown in FIG. 6(a), when the pneumatic tire 3 rotates in the rotational direction R1, airflow (relative wind) AR generated by the rotation collides with the side surface 303, and is led to the lateral groove 42A. Thereby, air around the pneumatic tire 3 is drawn into the lateral grooves 42A, and the amount of air flowing through the lateral grooves 42A can be increased. In this way, the heat transfer coefficient inside the lateral grooves 42A is improved to allow enhancement of the effect of decreasing the temperature of the land portion blocks 300.

Further, as shown in FIG. 6(b), when the pneumatic tire 3 rotates in the rotational direction R2, the rotation of the pneumatic tire 3 generates airflow (relative wind) AR flowing along the side surface 301. Accordingly, escape of air from the lateral groove 42A to the outer side in the tire width direction is promoted, so that the amount of air flowing inside the lateral grooves 42A can be increased. In this way, the heat transfer coefficient inside the lateral grooves 42A is improved to allow decrease in the temperature of the land portion blocks 300. Further, the temperature of the tread portion 13 can be decreased.

(4-3) Modification 3

Figure 7:
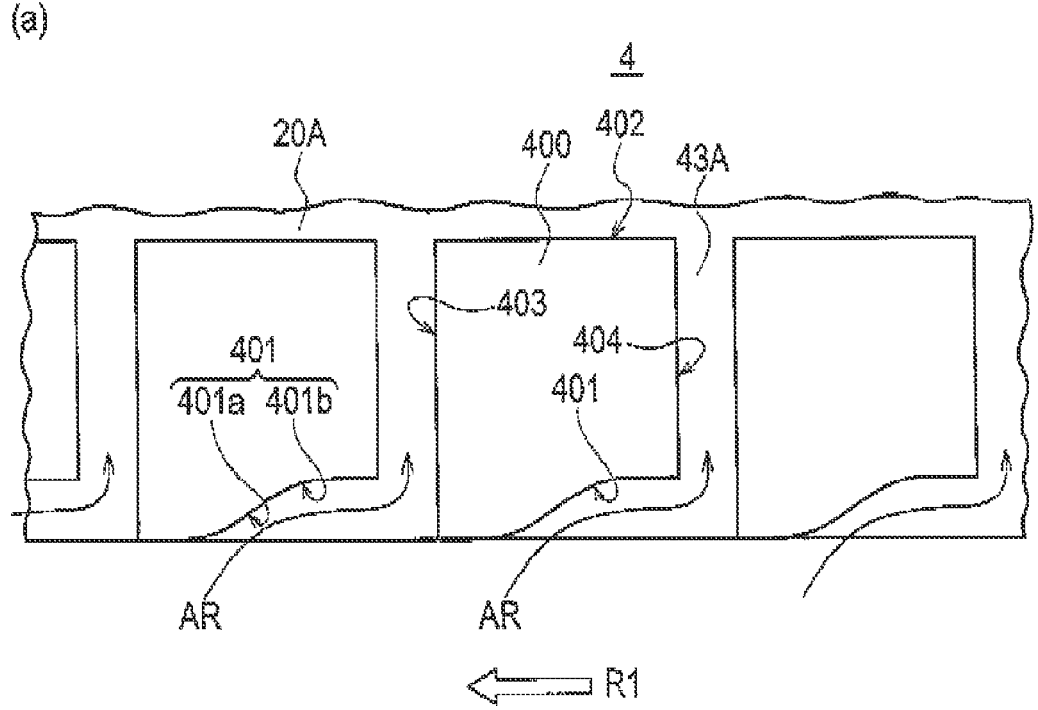
FIG. 7 is a plan view of a pneumatic tire shown as Modification 3 of this embodiment, seen in a direction perpendicular to its tread portion, and is a schematic diagram illustrating airflow AR generated when the pneumatic tire rotates in the rotational direction R.
Figure 7:
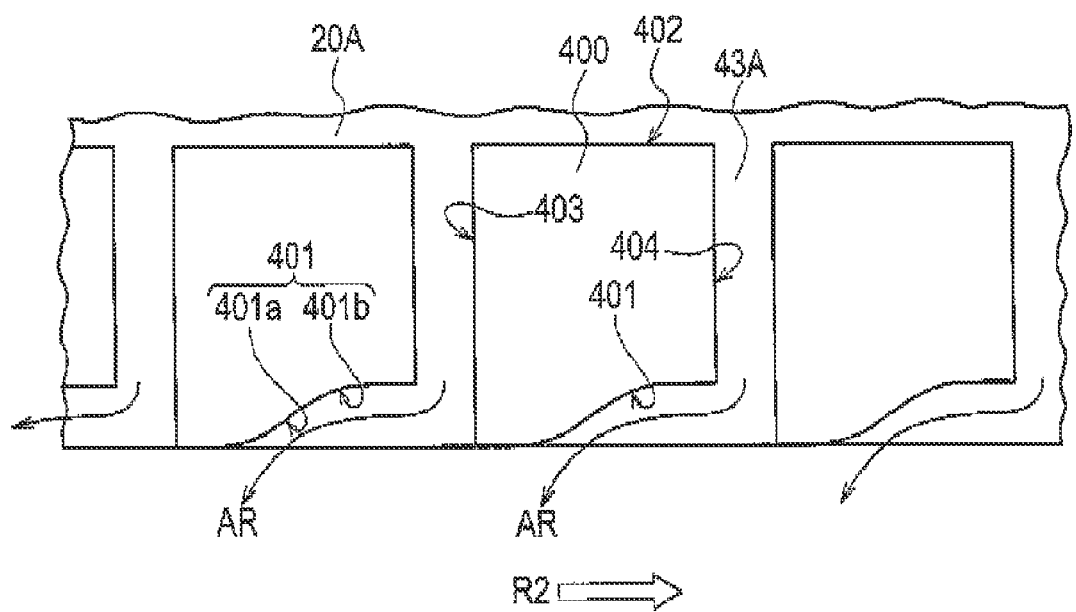

FIGS. 7(a), (b) are plan views of a pneumatic tire 4 shown as a modification of the present invention, seen in a direction perpendicular to the tread portion, and are schematic views illustrating airflow AR generated when the pneumatic tire 4 rotates. In the pneumatic tire 4 shown as Modification 3, land portion blocks 400 defined by the circumferential groove 20A and lateral grooves 43A each have a side surface 401 located on the buttress portion 14 side, a side surface 402 located on the opposite side from the side surface 401, a side surface 403 on an end portion 400A side of the land portion block 400, and a side surface 404 on an end portion 400B side of the land portion block 400. The end portion 400A is located on one side, in the tire circumferential direction, of the land portion block 400, and the end portion 400B is located on the other side, in the tire circumferential direction, of the land portion block 400. In this embodiment, the side surface 401 of each land portion bleak 400 is a curved surface. The curved surface 401 is formed by a curved surface portion 401a which is a curved surface bulging to the outer side in the tread width direction and a curved surface portion 401b which is a curved surface bulging to the inner side in the tread width direction. The curved surface portion 401a and the curved surface portion 401b are continuous to each other with an inflection point.

In the pneumatic tire 4 having such a shape, as shown in FIG. 7(a), when the pneumatic tire 4 rotates in the rotational direction R1, airflow (relative wind) AR generated by the rotation collides with the side surface 403 and is led into the lateral groove 43A. Thus, air around the pneumatic tire 4 is drawn into the lateral grooves 43A, so that the amount of air flowing inside the lateral grooves 43A can be increased. Thereby, the heat transfer coefficient inside the lateral grooves 43A can be improved to enhance the effect of decreasing the temperature of the land portion blocks 400.

Moreover, as shown in FIG. 7(b), when the pneumatic tire 4 rotates in the rotational direction R2, the rotation of the pneumatic tire 4 generates airflow (relative wind) AR flowing along the side surface 401. Accordingly, escape of air from the lateral groove 43A to the outer side in the tire width direction is promoted, so that the amount of air flowing inside the lateral grooves 43A can be increased. In this way, the heat transfer coefficient inside the lateral grooves 43A is improved to allow decrease in the temperature of the land portion blocks 400. Further, the temperature of the tread portion 13 can be decreased.

(4-4) Modification 4

Figure 8:
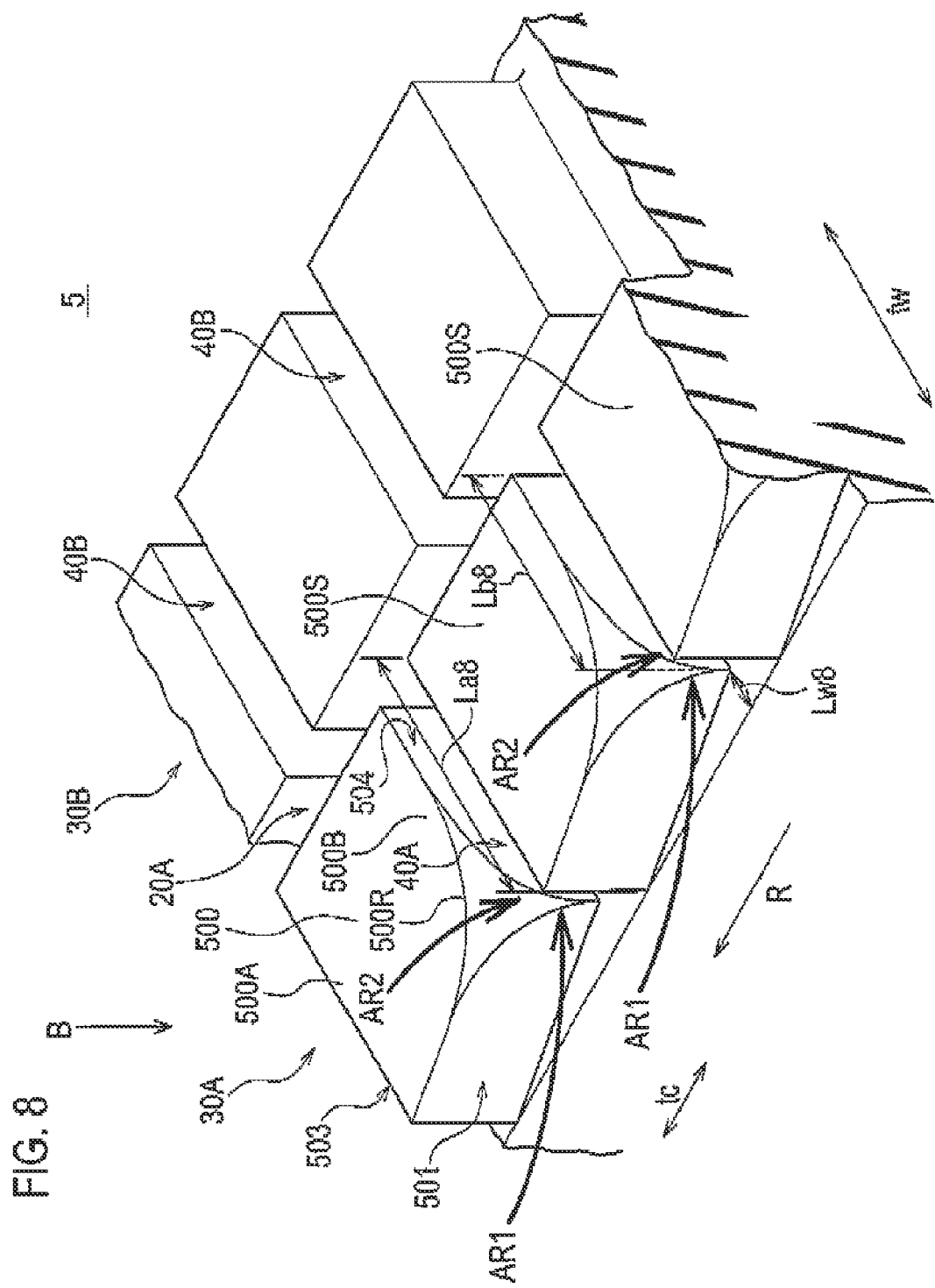
FIG. 8 is an enlarged perspective view of the tread of a pneumatic tire shown as Modification 4 of this embodiment.

FIG. 8 is an enlarged perspective view of a tread portion of a pneumatic tire 5 shown as a modification of this embodiment. FIGS. 9(a), (b) are plan views seen in the direction of arrow B in FIG. 8.

Land portion blocks 500 each have a side surface 501 located on the buttress portion 14 side, a side surface 502 located on the opposite side from the side surface 501, a side surface 503 on an end portion 500A side of the land portion block 500, and a side surface 504 on an end portion 500B side of the land portion block 500. The end portion 500A is located on one side, in the tire circumferential direction, of the land portion block 500, and the end portion 500B is located on the other side, in the tire circumferential direction, of the land portion block 500.

Figure 9:
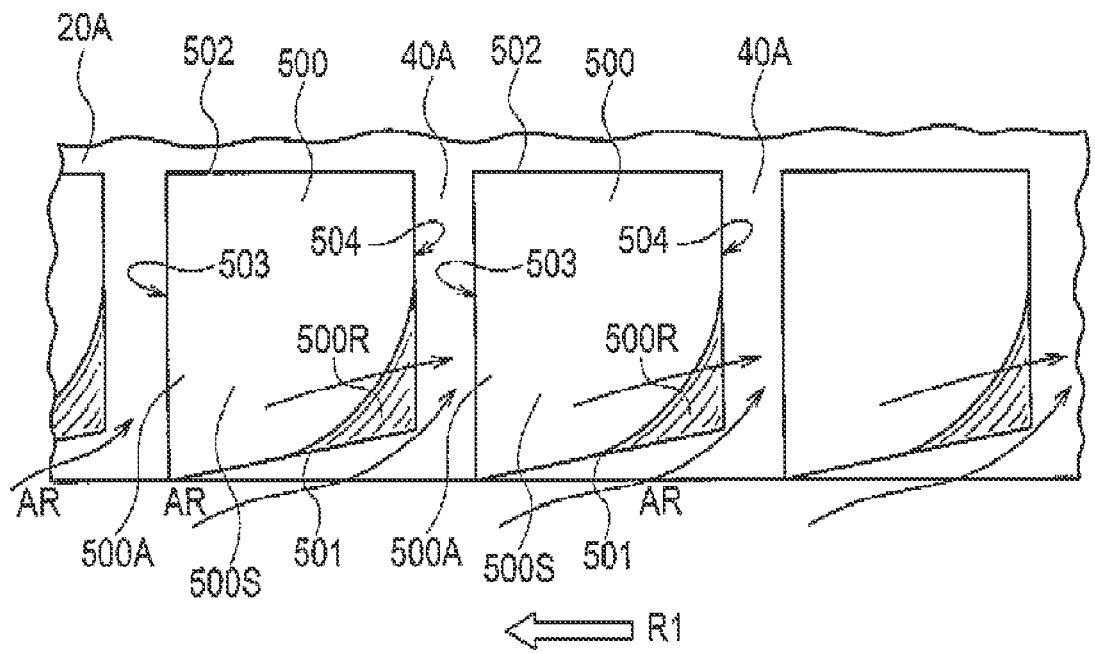
FIG. 9 is a plan view seen in a direction of arrow B in FIG. 8.
Figure 9:
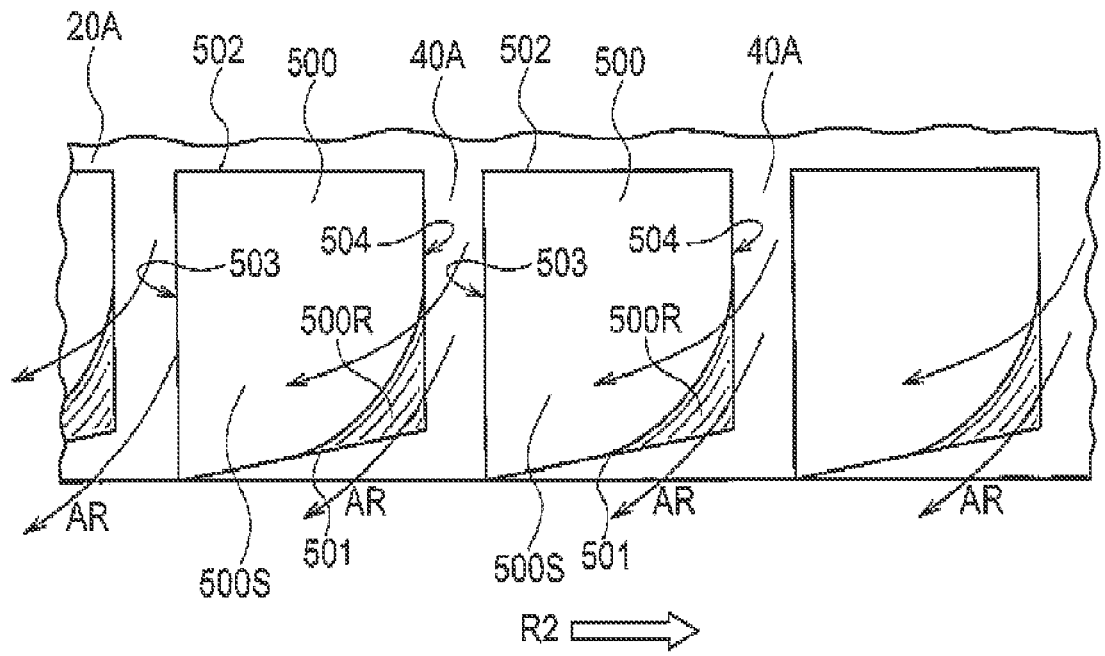

A round shape 500R is formed at a portion having a vertex of a surface 500S of the tread portion to be in contact with the read surface, the side surface 501, and the side surface 504 of each land portion block 500 of the pneumatic tire 5. In other words, the vertex of the surface 500S, the side surface 501, and the side surface 504 is chamfered. As shown in FIG. 9, the area of each land portion block 500 at its surface 500S in the tread portion to be in contact with the road surface in a plan view of the pneumatic tire 5 seen in the direction of arrow B in FIG. 8 is smaller than the area of the land portion block 500 at portions continuous to the groove bottoms 40Ab of the lateral grooves 40. The area of the land portion block 500 increases from, the surface 500S, to be in contact with the road surface, to the portion continuous to the groove bottom 40Ab.

When the pneumatic tire 5 rotates in the rotational direction R1, the end portion 500A on one side, in the tire circumferential direction, of the land portion block 500 is located on a front side in the rotational direction of the pneumatic tire 5 installed on a vehicle and rotated when the vehicle moves forward (the direction being indicated by arrow R1 in FIG. 9). The end portion 500B on the other side, in the tire circumferential direction, of the land partion block 500 is located on a rear side in the rotational direction R1. Length La8, in the tread width direction, of the end portion 500A of the land portion block 500 is larger than length Lb8, in the tread width direction, of the end portion 500A.

As described, the round shape 500R is formed to the portion having the vertex of the surface 500S of the tread portion to be in contact with the road surface, the side surface 501, and the side surface 504 of each land portion block 500 of the pneumatic tire 5. Thus, as shown in FIG. 9(a), when the pneumatic tire 5 rotates in the rotational direction R1, airflow AR1 flowing along the side surfaces 501 of the land portion blocks 500 as well as airflow AR2 flowing along the surfaces 500S collide with the side surfaces 503, and are easily drawn into the lateral grooves 40A. Thereby, the heat transfer coefficient inside the lateral grooves 40A can be improved to enhance the effect of decreasing the temperature of the land portion blocks 500.

Further, as shown in FIG. 9(b), when the pneumatic tire 5 rotates in the rotational direction R2, airflow AR flowing along the round shape 500R is generated. This airflow AR easily flows over the land portion blocks 500. Accordingly, escape of air from the lateral grooves 40A to the outer side in the tire width direction is promoted, so that the amount of air flowing inside the lateral grooves 40A can be increased. In this way, the heat transfer coefficient inside the lateral grooves 40A is improved to allow decrease in the temperature of the land portion blocks 500. Further, the temperature of the tread portion 13 can be decreased.

(4-5) Modification 5

Figure 10:
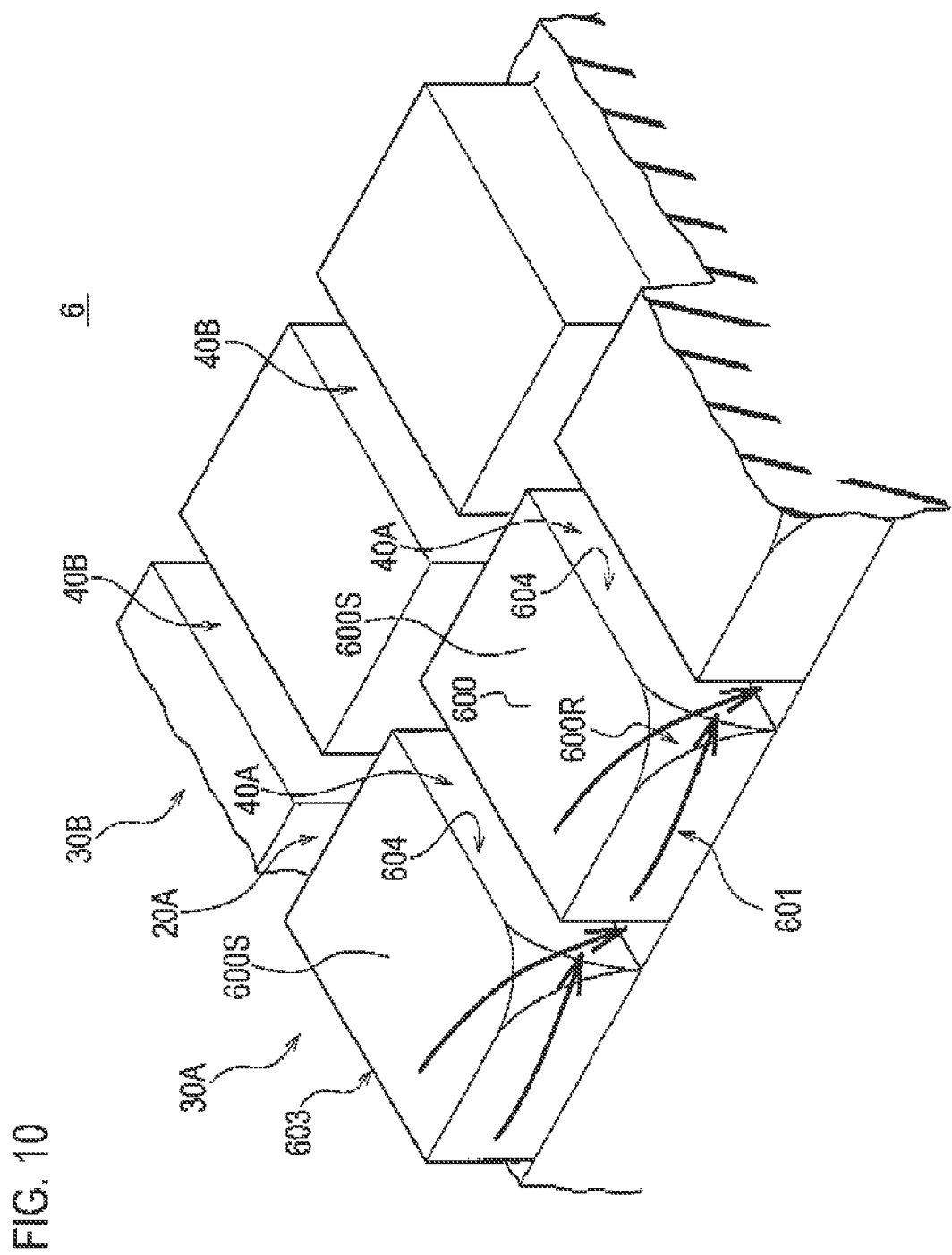
FIG. 10 is an enlarged perspective view of the tread of a pneumatic tire shown as Modification 5 of this embodiment.

FIG. 10 is an enlarged perspective view of a tread portion of a pneumatic tire 6 shown as a modification of this embodiment. A round shape 600R is formed at a portion having a vertex of a surface 600S of the tread portion to be in contact with the road surface, a side surface 601, and a side surface 604 of each land portion block 600 of the pneumatic tire 6. In other words, the vertex of the surface 600S, the side surface 601, and the side surface 604 is chamfered. As shown in FIG. 10, length, in the tread width direction, of an end portion 600A, of the land portion block 600 is equal to length, in the tread width direction, of an end portion 600B.

As described, the round shape 600R is formed to the portion having the vertex of the surface 600S of the tread portion to be in contact with the road surface, the side surface 601, and the side surface 604 of each land portion block 600 of the pneumatic tire 6. Thus, when the pneumatic tire 6 rotates in the rotational direction R, airflow AR1 flowing along the side surface 601 is easily drawn into the lateral groove 40A, and airflow AR2 flowing along the surfaces 600S is easily drawn into the lateral groove 40A. Thereby, the heat transfer coefficient inside the lateral grooves 40A can be improved to enhance the effect of decreasing the temperature of the land portion blocks 600.

(4-6) Modification 6

Figure 11:
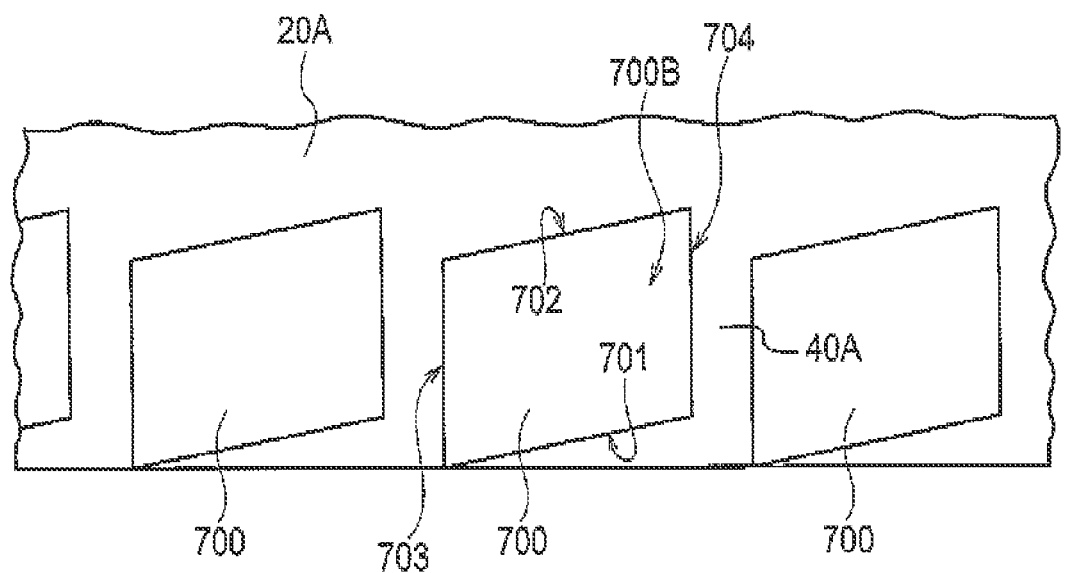
FIG. 11 is an enlarged perspective view of the tread of a pneumatic tire shown as Modification 6 of this embodiment.

FIG. 11 is an enlarged perspective view of a tread portion of a pneumatic tire 7 shown as a modification of this embodiment. In the pneumatic tire 7, the width, in the tire circumferential direction, of each land portion block 700 is constant from one side to the other side in the tire circumferential direction.

In other words, in each land portion block 700, in a plans view of the tread portion, side surfaces 701, 702 extending in the tire circumferential direction are inclined toward the tire equator from one side to the other side in the tire circumferential direction.

Note that, in this modification, the side surface 701 located on the outer side in the tire width direction may be parallel to the tire equator. That is, the side surface 701 does not need to be inclined to the tire equator.

(4-7) Modification 7

Figure 12:
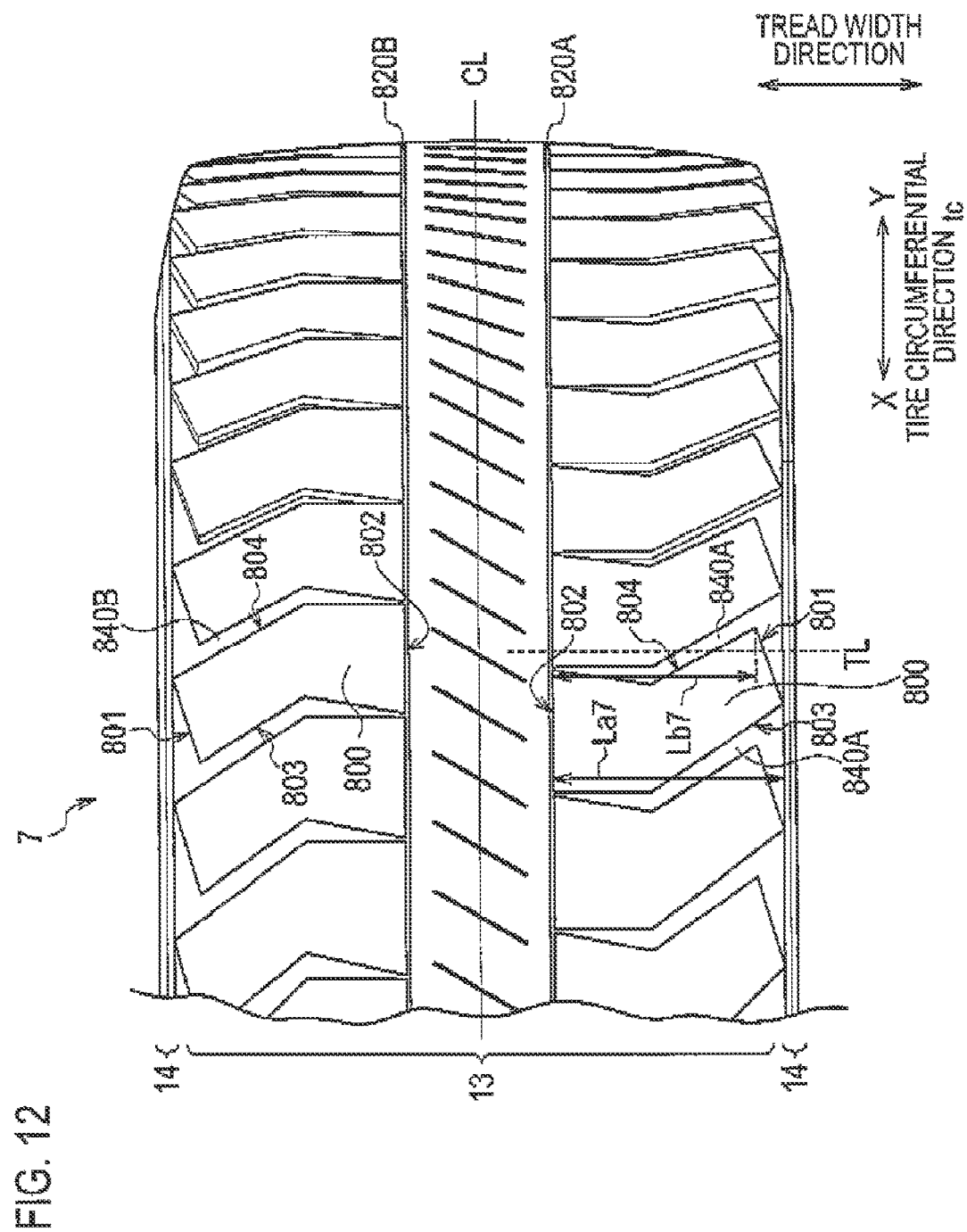
FIG. 12 is a diagram showing a pneumatic tire shown as Modification 7 of this embodiment.

FIG. 12 is a diagram illustrating a pneumatic tire 7 shown as a modification of this embodiment. As shown in FIG. 12, the pneumatic tire 7 according to Modification 7 has land portion blocks 800, circumferential grooves (a circumferential groove 820A and a circumferential groove 820B), and lateral grooves (lateral grooves 840A and lateral grooves 840B).

The land portion blocks 800 are defined by the circumferential groove and the lateral grooves. In Modification 7, the description is focused on the land portion blocks 800 defined by the circumferential groove 820A and the lateral grooves 340A.

The circumferential groove 820A and the circumferential groove 820B are grooves extending in the tire circumferential direction tc. The circumferential groove 820A and the circumferential groove 820B extend along the tire equator CL. The lateral grooves 840A and the lateral grooves 840B are grooves extending in the tread width direction. The lateral grooves 840A and the lateral grooves 840B are inclined with respect to the tread width direction line TL (i.e., a line intersecting the tire equator CL). More specifically, the lateral grooves 840A are inclined to the outer side in the tread width direction and toward a Y side, and the lateral grooves 840B are inclined to the outer side in the tread width direction and toward an X side.

The groove depth of each circumferential groove (the circumferential groove 820A and the circumferential groove 820B) is larger than the groove width of the circumferential groove (the circumferential groove 820A and the circumferential groove 820B). Further, the groove width of each lateral groove (the lateral grooves 840A and the lateral grooves 840B) is larger than the groove width of each circumferential groove (the circumferential groove 820A and the circumferential groove 820B). The groove depth of each lateral groove (the lateral grooves 840A and the lateral grooves 840B) is in a range of 40 mm to 250 mm. It should be noted that such a configuration is specific to a configuration of a heavy duty tire.

Here, a case where the groove widths in the tire circumferential direction are different is conceivable. Note that the "groove width" indicates the groove width of a portion having the largest groove width (the maximum groove width).

The groove width of each lateral groove (the lateral grooves 840A and the lateral grooves 840B) may be expanded from the inner side in the tread width direction to the outer side in the tread width direction.

The land portion blocks 800 defined by the lateral grooves 840A each have a side surface 801 located on the buttress portion 14 side, a side surface 802 located on the opposite side from the side surface 801, a side surface 803 located on the X side in the tire circumferential direction, and a side surface 804 located on the Y side in the tire circumferential direction.

In the tread width direction, length La7 of the side surface 803 is larger than length Lb7 of the side surface 804. In other words, the side surface 801 is inclined with respect to a line extending in the tire circumferential direction (i.e., the tire equator CL). More specifically, the side surface 801 is inclined to the Y side and to the inner side in the tread width direction.

As described, with regard to the land portion blocks 800 defined by the lateral grooves 840A, the lateral grooves 840A are inclined to the outer side in the tread width direction and to the Y side. Accordingly, when the tire rotates to the X side, the rotation of the pneumatic tire B causes air in the lateral grooves 840A to be led to the outer side in the tread width direction. Thus, the effect of decreasing the temperature of the land portion blocks 300 can be obtained.

The land portion blocks 800 defined by the lateral grooves 840B, on the other hand, each have a side surface 801 located on the buttress portion 14 side, a side surface 802 located on the opposite side from the side surface 801, a side surface. 804 located on the Y side in the tire circumferential direction, and a side surface 803 located on the X side in the tire circumferential direction. It should be noted that, in the land portion blocks 800 defined by the lateral grooves 840B, the side surfaces 801 are inclined to the X side and to the inner side in the tread width direction.

As described, in the land portion blocks 800 defined by the lateral grooves 840B, the lateral grooves 840B are inclined to the outer side in the tread width direction and to the X side. Accordingly, when the tire rotates to the Y side, the rotation of the pneumatic tire 8 causes air in the lateral grooves 840B to be led to the outer side in the tread width direction. Thus, the effect of decreasing the temperature of the land portion blocks 800 can be obtained.

(4-8) Modification 8

Figure 13:
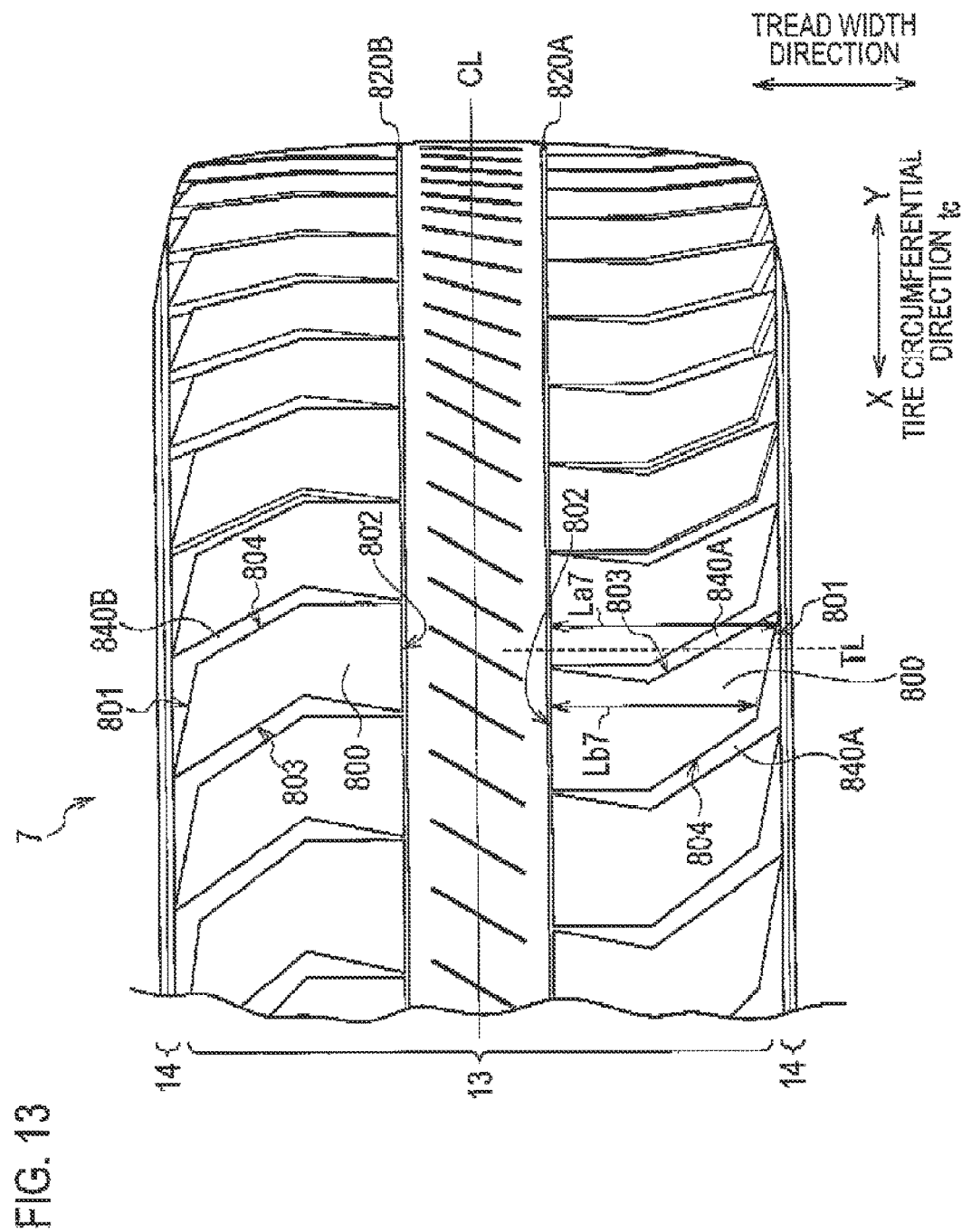
FIG. 13 is a diagram showing a pneumatic tire shown as Modification 8 of this embodiment.

FIG. 13 is a diagram showing a pneumatic tire 7 shown as a modification of this embodiment. Modification 8 is the same as Modification 7 , except for how side surfaces 801 are inclined. More specifically, lateral grooves 840A are inclined to the outer side in the tread width direction and to the Y side, and lateral grooves 840B are inclined to the outer side in the tread width direction and to the X side.

Land portion blocks 800 defined by the lateral grooves 840A each have a side surface 801 located on the buttress portion 14 side, a side surface 802 located on the opposite side from the side surface 801, a side surface 803 located on the Y side in the tire circumferential direction, and a side surface 804 located on the X side in the tire circumferential direction. The side surfaces 801 are inclined to the X aide and to the inner side in the tread width direction.

Accordingly, when the tire rotates to the Y side, the rotation of the pneumatic tire 8 causes air to flow in the opposite direction from the rotational direction and to collide with the side surface 803, and thus air is drawn into the lateral grooves 840A inclined to the outer side in the tread width direction and to the Y side. Thereby, the heat-transfer coefficient inside the lateral grooves 840A can be improved, and thus, the effect of decreasing the temperature of the land portion blocks 800 can be obtained.

Land portion blocks 800 defined by the lateral grooves 840B, on the other hand, each have a side surface 801 located on the buttress portion 14 side, a side surface 802 located on the opposite side from the side surface 801, a side surface 803 located on the X side in the tire circumferential direction, and a side surface 804 located on the Y side in the tire circumferential direction. The side, surfaces 801 are inclined to the Y side and toward the inner side in the tread width direction.

Accordingly, when the tire rotates to the X side, the rotation of the pneumatic tire 8 causes air to flow in the opposite direction from the rotational direction and to collide with the side surfaces 803, and thus the air is drawn into the lateral groove 840B inclined to the outer side in the tread width direction and to the X side. Thereby, the heat-transfer coefficient inside the lateral grooves 840B can be improved, and thus, the effect of decreasing the temperature of the land portion blocks 800 can be obtained.

(4-9) Modification 9

Figure 14:
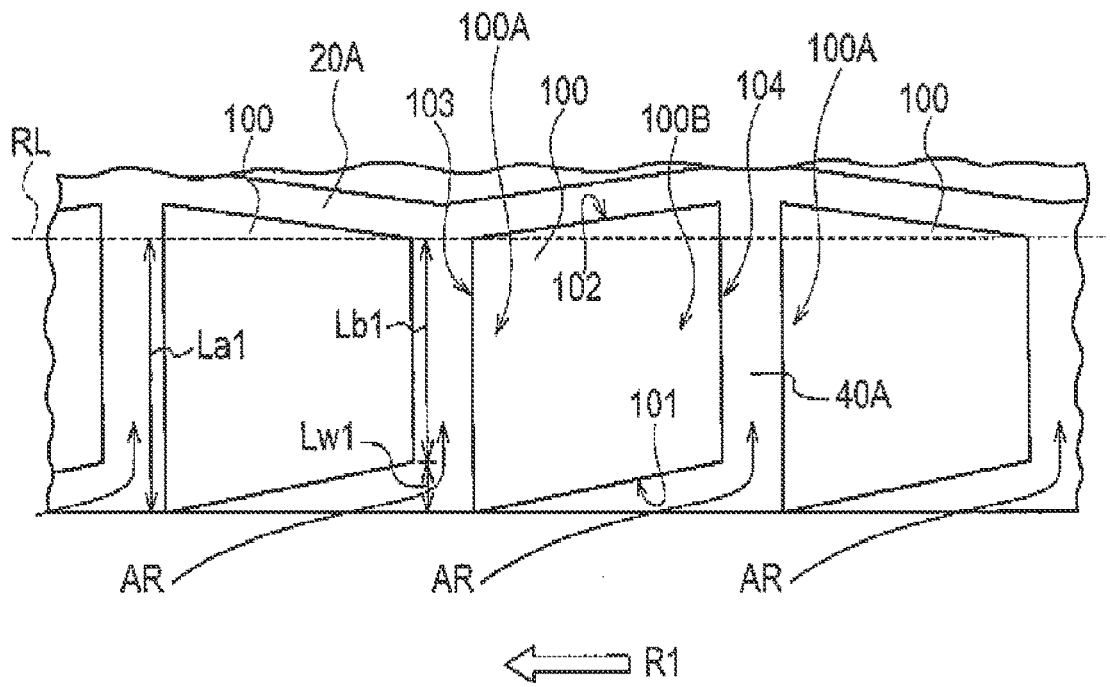
FIG. 14 is a diagram showing land portion blocks shown as Modification 9 of this embodiment.
Figure 14:
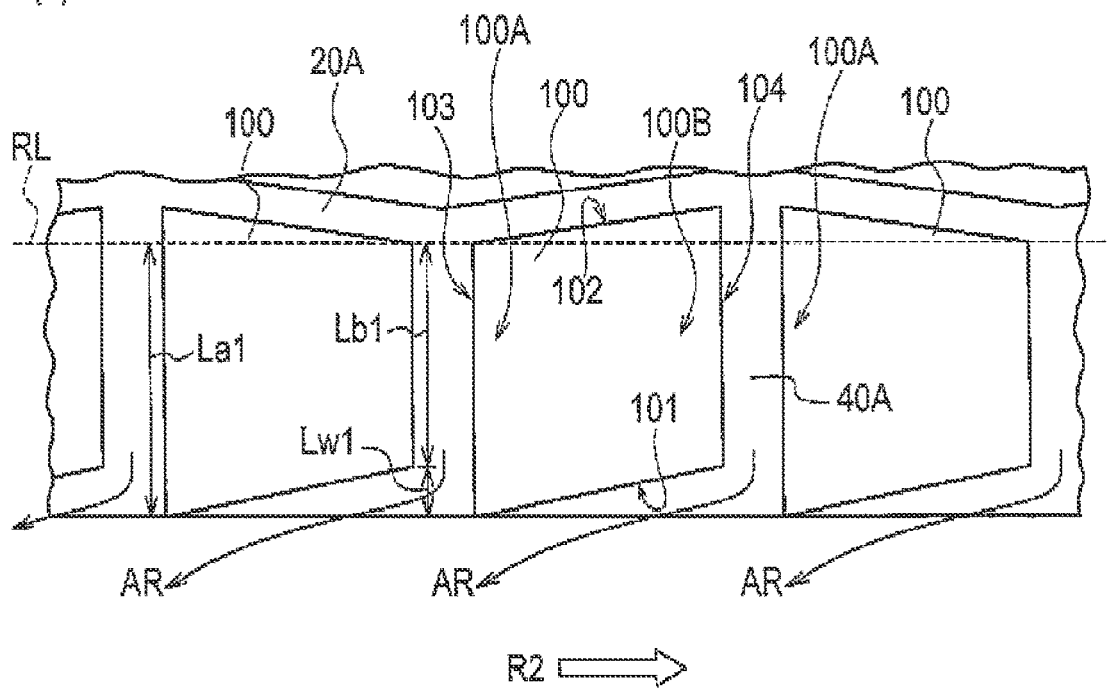

In Modification 9 , a description is given of a groove and reference line. FIG. 14 is a diagram showing land portion blocks shown as Modification 9 of this embodiment. Specifically, FIG. 14(*a*) and FIG. 14(*b*) are diagrams illustrating a groove end reference line RL.

As shown in FIG. 14(*a*) and FIG. 14(*b*), a circumferential groove 20A has a zigzag shape in the tire circumferential direction. In such, a case, the groove end reference line RL is a straight line extending in the tire circumferential direction, and is defined by end portions, on the inner side in the tread width direction, of lateral grooves 40A adjacent to each other in the tire circumferential direction with a land portion block 100 interposed therebetween.

More specifically, as shown in FIG. 14(*a*) and FIG. 14(*b*), the groove end reference line RL maybe a straight line extending in the tire circumferential direction and passing through an outermost point, in the tread width direction, of an end portion, located on the inner side in the tread width direction, of each of the lateral grooves 40A adjacent to each other in the tire circumferential direction with the land portion block 100 interposed therebetween.

Alternatively, the groove end reference line RL may be a straight line extending in the tire circumferential direction and passing through an outermost point, in the tread width direction, of the end portion, on the inner side in the tread width direction, of each of the lateral grooves 40A adjacent to each other in the tire circumferential direction with the land portion block 100 interposed therebetween. Still alternatively, the groove end reference line RL may be a straight line extending in the tire circumferential direction and passing through an intermediate point between the innermost point in the tread width direction and the outermost point in the tread width direction of the end portion, on the inner side in the tread width direction, of each of the lateral grooves 40A adjacent to each other in the fire circumferential direction with the land portion block 100 interposed therebetween.

Note that the groove and reference line is a reference line defining length La1 in the tread width direction and length Lb1 in the tread width direction. Specifically, length La1 in the tread width direction and length Lb1 in the tread width direction are each measured from the groove end reference line RL to the tread end, as shown in FIG. 14(a) and FIG. 14(b).

Although the case where the circumferential groove 20A has a zigzag shape in the tire circumferential direction is described in Modification 9 as an example, the embodiment is not limited to such a case. For example, even in a case where the lateral grooves 40A do not communicate with the circumferential groove, length La1 in the tread width direction and length Lb1 in the tread width direction can be defined by the groove end reference line RL determined by the end portions, on the inner side in the tread width direction, of the lateral grooves 40A.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments and examples will be easily found by those skilled in the art. For example, the embodiment of the present invention can be modified as follows.

The pneumatic tires of this embodiment offer remarkable effects when applied to what is called super-large tires, but can be applied to general-purpose tires, too. When the side surface (the buttress portion) of the land portion intersecting with the width direction of the tread portion has notch portions which are cut from the side surface of the land portion inward and which communicate with the lateral groove portions, the heat transfer coefficient of the pneumatic tire can be improved. Thus, in situations where the tread is likely to heat up due to running with a high speed or running on a rough road, increase in the temperature of the tread surface can be suppressed.

The tread pattern of the pneumatic tire 1 shown in FIG. 1 is used as a typical example. However, the tread pattern is not limited to such a tread pattern. For example, the tread pattern may have rib-shaped land portions in which no lateral groove is formed near the tire equator of the pneumatic tire 1.

In the embodiment described above, the lateral groove portions (the lateral grooves 40, the lateral grooves 41) all have the same angle with respect to the tire circumferential direction. However, the angles formed by the lateral groove portions with respect to the tire circumferential direction do not necessarily have to be the same within the pneumatic tire. For example, the angels may be different for each of the circumferential land portions 30A, 30E, 30C. Further, lateral groove portions having different angles may be formed in a single circumferential land portion 30A.

In this embodiment, length Lb1, in the tread width direction, of the end portion 100B of each land portion block 100 is smaller than length La1, in the tread width direction, of the end portion 100A. However, as long as the end portion 100B, on the rotational-direction rear side in the tire circumferential direction, of the land portion block 100 is located inward, in the tread width direction, of the sidewall portion 12 by length Lw, airflow (relative wind) AR flowing in the opposite direction from the rotational direction R can collide with the end portion 100A of the land portion block 100 located behind in the rotational direction. For this reason, La>Lb does not necessarily have to be met.

In the embodiment described above, the land portion blocks described in FIGS. 7 to 11 are applied to the land portion blocks 100 shown in FIG. 1, but maybe applied to the land portion blocks of a type shown in FIG. 5 and Modification 1, where the lateral groove portions are inclined with respect to the tread width direction line TL.

In the embodiment described above, only the shape of the side surface, on the outer side in the tire width direction, of each land portion block is described in FIGS. 1 to 10. However, as shown, in FIG. 11, both of the side surfaces extending in the tire circumferential direction may have the shape described using FIGS. 1 to 10.

As described above, the present invention naturally includes various embodiments which are not described herein. Accordingly, the technical scope of the present invention should be determined only by the matters to define the invention in the scope of claims regarded as appropriate based on the description.

This application claims the benefit of priority from Japanese Patent Application No. 2010-116022 (filed on May 20, 2010), the contents of which are incorporated herein by reference.

INDUSTRIAL APPLICABILITY

The present invention can provide a tire capable of reliably improving the dissipation performance without lowering the rigidity and the wear resistance of the tread portion.

The invention claimed is:
1. A heavy duty tire comprising:
bead portions;
sidewall portions continuous to the respective bead portions;
a tread portion to be in contact with a road surface; and
buttress portions each extending inward in a tire radial direction from a corresponding tread end portion of the tread portion and continuous to a corresponding one of the sidewall portions, the tread end portion being located on an outer side, in a width direction, of the tread portion, wherein
in the tread portion, a plurality of lateral groove portions intersecting with a tire circumferential direction and land portions defined by the lateral groove portions are formed, at least one end portion in the tread width direction of each lateral groove portion opens to a tread end, the land portions each having a side surface intersecting with the width direction of the tread portion,
a length, in the tread width direction, of each of the land portions decreases from one side to an other side in the tire circumferential direction,
the length, in the tread width direction, of the land portion is a length from a groove end reference line extending in the tire circumferential direction to the tread end, and
the groove end reference line is defined by inner ends, in the tread width direction, of the respective lateral groove portions adjacent to each other in the tire circumferential direction with the land portion interposed therebetween, wherein:
the side surface is a surface on an outer side in the tread width direction of each of the land portion, an end portion on the other side in the tire circumferential direction of the side surface is located on an inner side in the tread width direction of an end portion on the one side in the tire circumferential direction of the side surface, an extending direction of the lateral groove portion formed on the other side in the tire circumferential direction of the land portion, is inclined with respect to a tread width direction line which extends along the tread width direction, in a plan view of the tread portion, an angle between the extending direction of the lateral groove portion and the tread width direction line is smaller than an angle between the side surface and the tread width direction line, and wherein a curved surface portion configured to abut on the groove bottom portions of the lateral groove portions is formed on a portion having a vertex of a surface of the tread portion, the side surface formed on the outer side of the land portion, and a side surface formed on the other side in the tire circumferential direction of the land portion, wherein the vertex has an obtuse angle between the side surface of the land portion and the wall surface of a corresponding one of the lateral groove portions, wherein the land portions comprises:
a first land portion provided at a first end in the tire width direction and having a first side surface; and
a second land portion provided at a second end opposite to the first end in the tire width direction and having a second side surface, and wherein the first and the second side surfaces extend in a substantially parallel direction with each other.

2. The heavy duty tire according to claim 1, wherein
a circumferential groove portion extending in the tire circumferential direction is formed, and
the lateral groove portions communicate with the circumferential groove portion.

3. The heavy duty tire according to claim 1, wherein
a circumferential groove portion extending in the tire circumferential direction is formed, and
a groove depth of the circumferential groove portion is larger than a groove width of the circumferential groove portion.

4. The heavy duty tire according to claim 1, wherein
a circumferential groove portion extending in the tire circumferential direction is formed, and
a groove width of each of the lateral groove portions is larger than a groove width of the circumferential groove portion.

5. The heavy duty tire according to claim 1, wherein
in a plan view of the tread portion, the side surface of the land portion intersecting with the width direction of the tread portion is a curved line.

6. The heavy duty tire according to claim 5, wherein
in a plan view of the tread portion, the side surface of the land portion intersecting with the width direction of the tread portion is a curved line having an inflection point.

7. The heavy duty tire according to claim 1, wherein
an area of the land portion at its surface in the tread portion to be in contact with the road surface is smaller than an area of the land portion at portions continuous to groove bottom portions of the lateral groove portions.

8. The heavy duty tire according to claim 1, wherein
the lateral groove portions are inclined with respect to a tread width direction line extending in the tread width direction,
a length, in the tread width direction, of one of end portions, in the tire circumferential direction, of the land portion is larger than a length, in the tread width direction, of an end portion of the land portion having an obtuse angle between the side surface of the land portion and the wall surface of a corresponding one of the lateral groove portions.

9. The heavy duty tire according to claim 1, wherein the heavy duty tire is a tire for a construction vehicle.

10. The heavy duty tire according to claim 1, wherein:
the buttress portions comprising a first buttress portion and a second buttress portion provided opposite to the first buttress portion along the tread width direction,
a length, in the tread width direction, of the first land portion is smaller than a length, in the tread width direction, at a corresponding position along the tire circumferential direction of the second land portion.

\* \* \* \* \*